United States Patent [19]

Uchida

[11] Patent Number: 5,224,599
[45] Date of Patent: Jul. 6, 1993

[54] FLOPPY DISK CONTAINER

[75] Inventor: Hiromichi Uchida, Tokyo, Japan

[73] Assignee: Toyo Chemical Co., Ltd., Tokyo, Japan

[21] Appl. No.: 924,752

[22] Filed: Aug. 4, 1992

[51] Int. Cl.⁵ ............................................ B65D 85/30
[52] U.S. Cl. .................... 206/444; 206/461; 206/472; 206/473
[58] Field of Search ............... 206/309, 312, 313, 472, 206/473, 232, 425, 444, 450, 461; 281/31; 402/79

[56] References Cited

U.S. PATENT DOCUMENTS

| | | | |
|---|---|---|---|
| 3,372,858 | 3/1968 | Brody | 281/31 |
| 4,039,079 | 8/1977 | Laughton | 206/461 |
| 4,473,153 | 9/1984 | Colangelo | 206/444 |
| 4,549,658 | 10/1985 | Sfikas | 206/444 |
| 4,664,258 | 5/1987 | Eichner | 206/444 |
| 4,691,826 | 9/1987 | Ozeki | 206/444 |
| 4,778,047 | 10/1988 | Lay | 206/425 |
| 4,793,477 | 12/1988 | Manning et al. | 206/444 |
| 4,805,766 | 2/1989 | Garcia | 206/461 |
| 4,860,897 | 8/1989 | Fowler et al. | 206/444 |
| 4,892,194 | 1/1990 | Garcia | 206/461 |
| 4,928,828 | 5/1990 | Cohen | 206/472 |
| 4,971,195 | 11/1990 | Mitsuyama | 206/313 |
| 5,031,772 | 7/1991 | Woodriff | 206/444 |
| 5,086,923 | 2/1992 | King et al. | 206/313 |

Primary Examiner—David T. Fidei
Attorney, Agent, or Firm—Wenderoth, Lind & Ponack

[57] ABSTRACT

A floppy disk container comprises a plate having an adhesive tape or agent applied to a rear face thereof. Three edges of a flexible plastic film of an approximately square shape are fastened to the plate, and the remaining edge of the film is free from attachment to the plate and positioned at a mid portion of the plate in order to obtain an upwardly opening insertion opening of the floppy disk container. Thus, a bag-like floppy disk container is obtained. A pair of stoppers are formed to protrude from an upper portion of the front face of the plate at positions just above the top edge of the floppy disk when the floppy disk is in the container, so as to abut the top edge of the floppy disk and prevent the floppy disk from falling out of the container. In addition, a transverse elongated ridge in parallel with the insertion opening is formed on the front face of the plate between the insertion opening and the stoppers, in order to leave a gap between the top edge of the floppy disk and the plate 3.

4 Claims, 2 Drawing Sheets

FLOPPY DISK CONTAINER

BACKGROUND OF THE INVENTION

(1) Technical Field

The present invention relates to a floppy disk container which can be pasted or stuck to a board, such as a binder, in order to accommodate and store floppy disks. The floppy disk container of the present invention provides excellent storage of floppy disks and allows for smooth and easy insertion of the floppy disks.

(2) Description of the Prior Art

Bag-type floppy disk containers are conventional and consist of a plate-shaped plastic sheet having a back face covered with a double-sided adhesive tape or the like, and a flexible plastic film of an approximately square shape fastened to the plastic sheet along three sides or edges so as to leave one side of the plastic film free from the plastic sheet to define an insertion opening at an intermediate position of the plate-shaped plastic sheet. In order to use the conventional floppy disk container, a peel-off paper is removed from the double-sided adhesive tape stuck on the back face of the plastic sheet, the plastic sheet is adhered to a board, such as a binder, and a floppy disk is inserted through the insertion opening.

However, when the binder or the like having the floppy disk container attached thereto is turned upside down, the floppy disk contained and held in the floppy disk container will slip out of the container resulting in damage to or loss of the floppy disk. The damage resulting to the owner of the floppy disk can be high since floppy disks are valuable, in that they often contain important information.

When the size of the insertion opening of the floppy disk container is large, it is easy to insert and remove the floppy disk from the container, but the floppy disk will likely slip out of the container during handling. On the contrary, when the insertion opening of the floppy disk container is small, it is difficult for the floppy disk to slip out of the container inadvertently, but it is also difficult to insert and remove the floppy disk from the container.

Nowadays, consequently, almost all conventional floppy disk containers fail to provide both satisfactory or storageability and satisfactory insertability of the floppy disk.

SUMMARY OF THE INVENTION

Consequently, it is the purpose of the present invention to provide a floppy disk container which reliably stores the floppy disk by preventing the floppy disk from slipping out, and allows for smooth and easy floppy disk insertion and removal. Accordingly, the present invention provides a floppy disk container having stoppers formed just above where the top edge of the floppy disk will be disposed, and an elongated ridge to separate the top edge of the disk from the back plate of the floppy disk container.

DETAILED DESCRIPTION OF THE INVENTION

Figure 1:
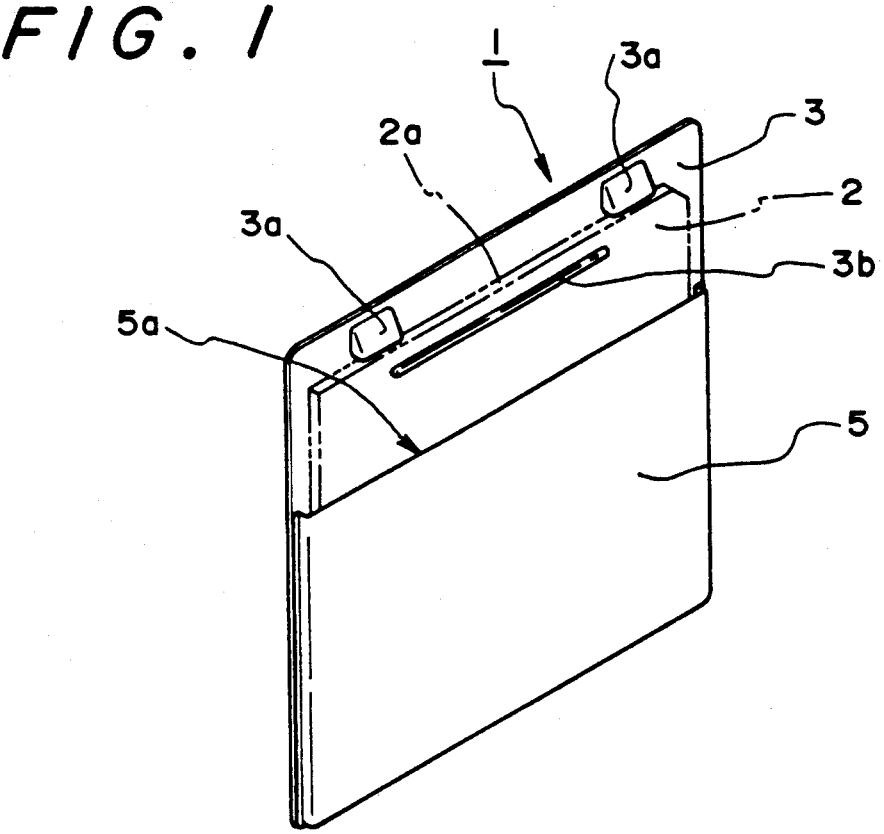
FIG. 1 is a perspective view of a floppy disk container according to the present invention.

As clearly shown, reference numeral 1 represents a floppy disk container of the present invention and 2 represents a floppy disk. The floppy disk container 1 consists of a plate 3 formed of a plastic sheet or a synthetic resin sheet having a double-sided adhesive tape 4 applied to the rear or back face thereof, and a flexible plastic film or flexible synthetic resin film 5 of an approximately square shape. The plastic film 5 is fastened to the plate 3 by overlapping three edges of the film on the left, the right and the bottom edges of the plate 3, and welding or bonding them to the plate 3. The remaining (or the fourth or top) edge of the plastic film 5 is disposed at the mid portion of the plate but is not bonded thereto. This construction results in a bag-shaped floppy disk containing portion having an upwardly open portion 5a.

The plate 3 has a pair of stoppers 3a and 3a, with a thickness of about 3 mm, formed at positions corresponding to the top edge 2a of the floppy disk 2 when the floppy disk 2 is inserted through the open portion 5a of the plastic film or floppy disk containing portion 5. An elongated protruding portion or ridge 3b is formed in parallel with the open portion 5a of the plastic film 5 at a position between the stoppers 3a and 3a and the open portion 5a. The role or function of the ridge 3b is to separate the top edge 2a of the floppy disk 2 from a front surface of the plate 3. According to the embodiment of the present invention, the stoppers 3a, 3a and the ridge 3b are integrally formed when the plate 3 is manufactured. However the present invention is not restricted to such construction. In another embodiment of the present invention, the stoppers 3a, 3a and the ridge 3b are manufactured separately from the plate 3, and then fastened or bonded to the plate 3.

Figure 2:
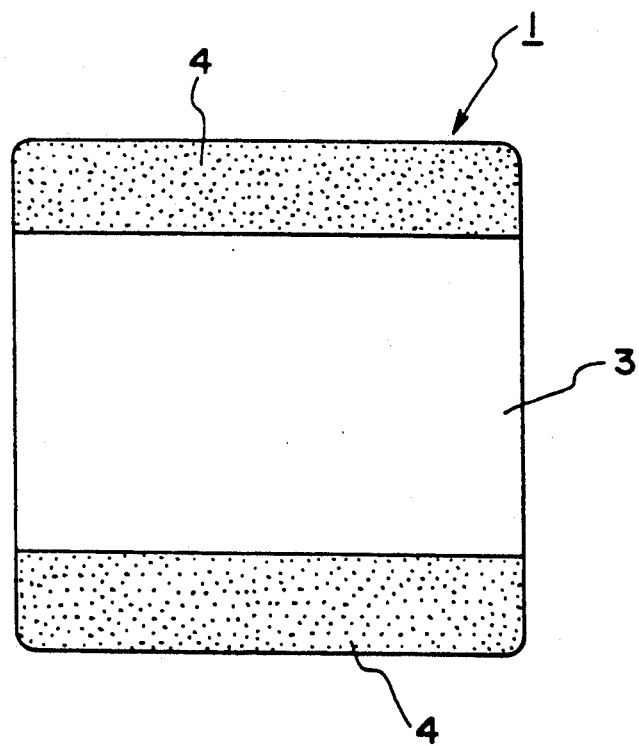
FIG. 2 is a rear view of the floppy disk container.

As shown in FIG. 2, the double-sided adhesive tapes 4 and 4 are applied at top and bottom positions of the rear face of the plate 3 and, if necessary, peeling papers are attached on the double-sided adhesive tapes to make handling of the floppy disk container 1 of the present invention easy. Alternatively, it is possible to paint an adhesive liquid or agent on the back face of the plate 3.

Figure 3:
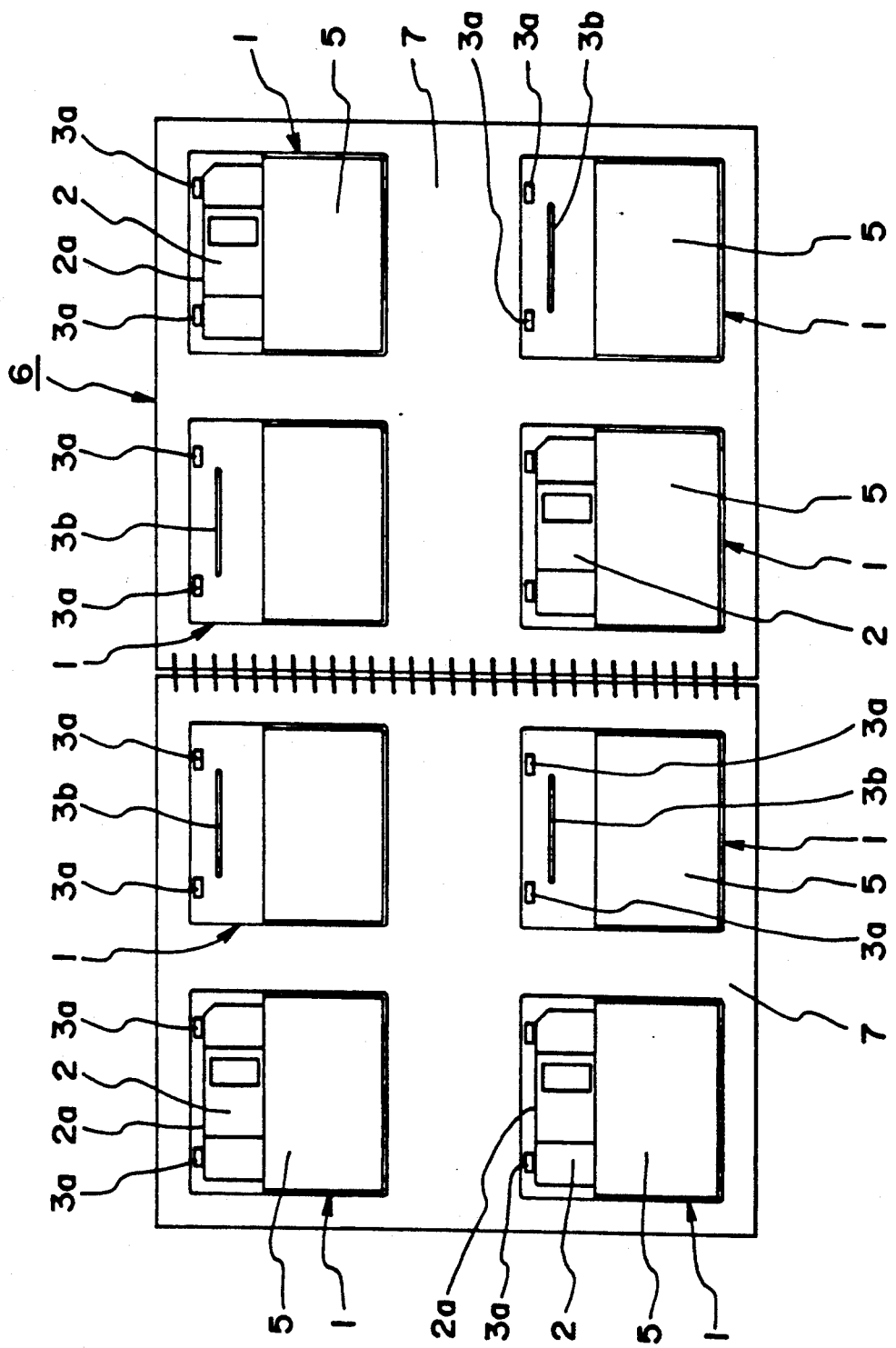
FIG. 3 is a front view of a plurality of the floppy disk containers in use.

According to the present invention, several floppy disk containers 1 are pasted or applied, as shown in FIG. 3, onto a board 7 of a binder 6, and several floppy disks 2 can be inserted into the floppy disk containers 1 with the upper edges 2a of the floppy disks 2 abutting the stoppers 3a to reliably retain the floppy disks 2 in the containers 1.

It is noted that the floppy disk 2 inserted and held in the floppy disk container 1 of the present invention doesn't slip out of the container 1 because the top edge 2a of the floppy disk 2 abuts against the stoppers 3a. In addition, is easy for a user to pick up or hold the top edge 2a of the floppy disk 2 between his fingers and to take the floppy disk 2 out of the floppy disk container 1, because a space or gap is formed between the top edge 2a of the floppy disk 2 contained in the container 1 and the plate 3 due to the provision of the ridge 3b.

Although the floppy disk container of the above embodiment of the present invention contains one floppy disk 2, it is of course possible to, as shown in FIG. 3, stick a plurality of plastics films to a large plate and leave top edges of the films open in order to obtain a plurality of bags (or floppy disk containers) to respectively contain floppy disks 2.

In addition, although the floppy disk container 1 of the present invention has been described as useful for containing floppy disks, it is not restricted to such use. Rather, the floppy disk container 1 can also be used for various other goods, such as IC cards or the like, or packaged coins or the like.

As described above in detail, according to the present invention, a bag-like floppy disk container includes a plate and a plastic film attached to a front face of the plate. The plastic film is bonded to the plate at its bottom and side edges, but its top edge is not bonded to the plate. Therefore, the top edge, provided with which is positioned between the top and bottom edges of the plate, defines an opening for insertion of a floppy disk. Stoppers are mounted on an upper portion of the front face of the plate just above the insertion opening so as to abut with the top edge of the floppy disk contained in the floppy disk container. In this manner, a floppy disk contained in the floppy disk container can be securely held in place if the floppy disk container is turned upside down.

An elongated protruding portion or ridge is formed on the plate at a position between the insertion opening and the stoppers so as to cause a gap to be formed between the top edge of the floppy disk contained in the container and the plate. In this manner, the top edge or side of the floppy disk can be easily and conveniently picked up by a user's fingers and taken out of the floppy disk containing portion.

In addition, when an adhesive means such as an adhesive coating or a double-sided tape is applied to the rear face of the plate, it is possible to stick the floppy disk container to any desired place, such as a binder, a notebook, or the like.

Consequently, according to the present invention, the problem of the conventional floppy disk container, that when the insertion opening of the floppy disk container is large, the floppy disk is easy to insert and remove, but the floppy disk held in the container is likely to slip out of the container and, on the contrary, when the size of the insertion opening is small so that the floppy disk will not fall out of the container, the floppy disk will be difficult to insert and remove from the container, has been solved. Additionally, the present invention provides both good storage and easy insertion of the floppy disk. In other words, the present invention not only provides reliable storage of the floppy disk, but also provides for smooth insertion of the floppy disk into the floppy disk container.

What is claimed is:

1. A floppy disk container comprising:
   a rear sheet having a front face, a rear face, a top edge and a bottom edge;
   a front sheet having top, bottom and side edges;
   said bottom and side edges of said front sheet being bonded to said front face of said rear sheet, and said top edge of said front sheet being free from said rear sheet and positioned between said top and bottom edges of said rear sheet to define an insertion opening for inserting a floppy disk between said front sheet and said rear sheet;
   at least one stopper mounted to said rear sheet at a position above said insertion opening to abut a top edge of the floppy disk when the floppy disk is inserted between said front sheet and said rear sheet and prevent the floppy disk from falling out from between said front sheet and said rear sheet;
   a ridge member mounted on and protruding from said front face of said rear sheet between said stopper and said insertion opening, so as to cause a gap to be formed between the top edge of the floppy disk and said rear sheet when the floppy disk is inserted between said front sheet and said rear sheet.

2. A floppy disk container as recited in claim 1, wherein
   said at least one stopper comprises a plurality of stoppers.

3. A floppy disk container as recited in claim 1, further comprising
   an adhesive means, on said rear face of said rear sheet, for adhering said floppy disk container to a board.

4. A floppy disk container as recited in claim 1, wherein
   said ridge member is elongated and extends in a direction parallel to said top edge of said front sheet.

* * * * *